July 13, 1948.  D. R. CONRAD ET AL  2,444,979
TELESCOPING DRAWBAR
Filed Aug. 6, 1945
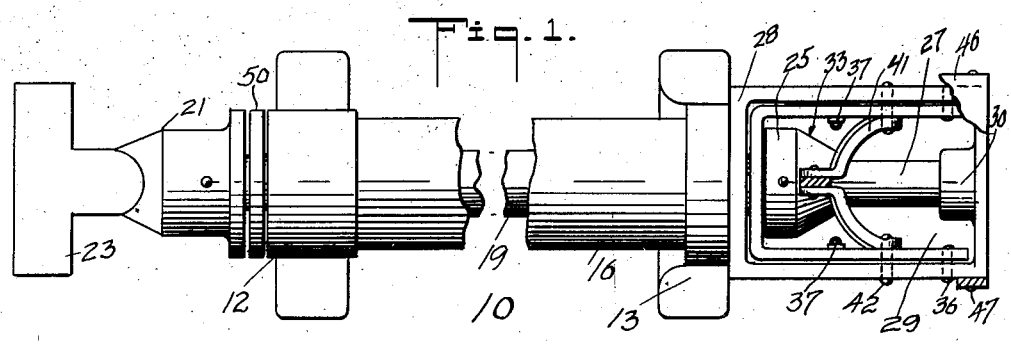
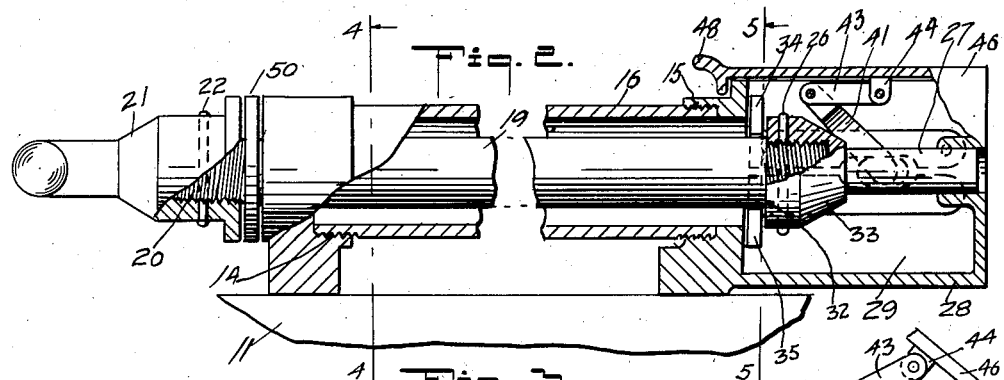
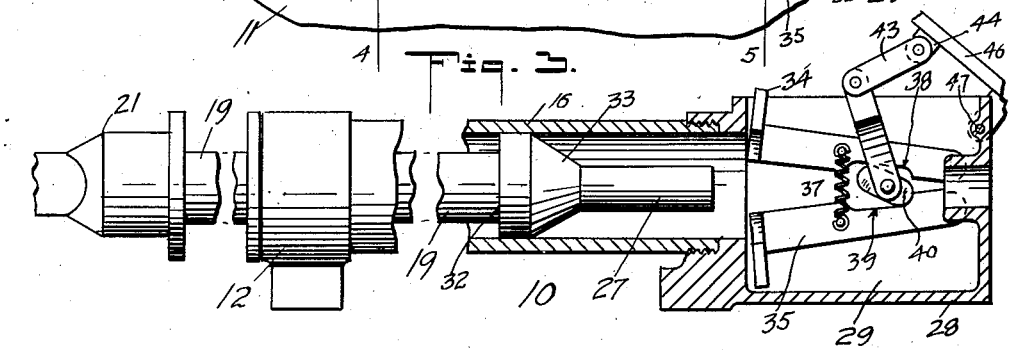
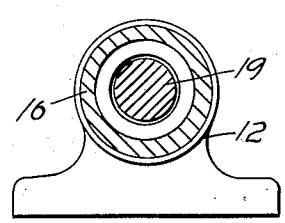
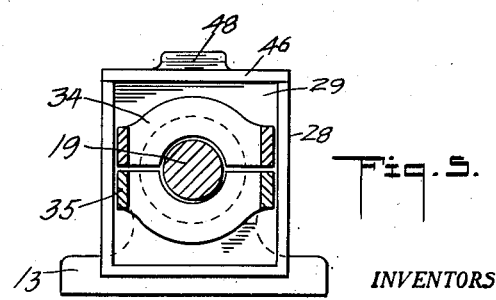
INVENTORS:
D. R. Conrad &
F. M. Reynolds
BY O. O. Martin
ATTY.

Patented July 13, 1948

2,444,979

UNITED STATES PATENT OFFICE 2,444,979

TELESCOPING DRAWBAR

Delmar R. Conrad and Frank M. Reynolds, San Gabriel, Calif.

Application August 6, 1945, Serial No. 609,062

5 Claims. (Cl. 280—33.14)

This invention relates to telescoping drawbars.

The general object of the invention is to provide an improved device, which is particularly adapted for use in coupling highway vehicles, and in which means is provided for allowing limited movement between the component parts of the device after the vehicles are coupled and before they are brought to tractive position.

A more specific object of our invention is to provide a device which includes a pair of sliding members one of which is adapted to be connected to a pulled vehicle and wherein the parts slide until they are moved to a locking position.

Another object of the invention is to provide a telescoping device including novel means for locking the members thereof in tractive position.

Another object of the invention is to provide a telescoping device including novel means for releasing the members thereof for relative movement.

Other objects and the advantages of our invention will be apparent from the following description taken in connection with the accompanying drawings, wherein:

Fig. 1 is a plan view, with parts broken away, of our telescoping drawbar;

Fig. 2 is a central, sectional side view through the drawbar;

Fig. 3 is similar view, showing the drawbar in a different position of adjustment; and Fig. 4 is a cross sectional view taken on line 5—5, Fig. 3.

Fig. 5 is a section taken on line 5—5, Fig. 2.

Referring to the drawing by reference characters we have shown our invention embodied in a telescoping drawbar which is indicated generally at 10. This drawbar includes a pair of end members 12 and 13 which are suitably mounted on a vehicle 11. These end members are provided with threaded recesses 14 and 15, adapted to receive a tube 16 which hold the end members assembled.

The end members are provided with a central aperture through which a pull bar 19 extends. The projecting end of the pull bar is threaded as at 20 to receive a coupling member 21, which is held in position thereon by a pin 22. The cross bar 21 includes a cross head 23 as shown in the drawing.

The other end of the pull bar 19 is threaded to receive a cylindrical head 25, which tapers outwardly to merge into a cylindrical pilot 27, and it is held in position by means of a pin 26. From the member 13 extends a rectangular frame 28, the outer wall of which carries an annular guide 30 for the end of this pilot.

Mounted within the chamber 29 we show upper and lower pivoted U-shaped arms 34 and 35. These arms are mounted on pins 36 for tilting movement. At their ends each arm is recessed together to form a substantially cylindrical collar, the internal diameter of which is slightly greater than that of the bar 19, but which is less than that of the head 25 so that, when the arms 34, 35 are together as shown in Figs. 2 and 5, they surround the pull rod 19 and are engaged by the shoulder 32 of the head to prevent forward movement of the head and consequently forward movement of the pull rod 19.

The arms 34 and 35 are normally urged towards each other by springs 37 so that they normally assume the engaging position. In order to rock the arms about their pivots we provide these arms with pairs of upper and lower cam recesses 38 and 39, which are engaged by cam members 40. These members are disposed in the lower ends of a stirrup member 41, which at 42 is pivotally connected to the side wall of the chamber 29. The upper end of the stirrup 41 is pivotally connected to a link 43, which is pivoted to a bracket 44. The latter is mounted on the lower face of a closure 46, which is pivotally hung on the frame 28 at 47 and which serves to close the upper portion of the chamber 29. The closure 46 is provided with a flange 48 by means of which it may manually swing into open position.

In coupling trailers to trucks or other tractive vehicles, wherein the conventional coupling joint is provided, it is difficult quickly to couple the vehicles together since there is no provision made for relatively longitudinal movement between the coupled elements. With our invention, when the coupling is to be effected, the pull bar 19 is released for forward movement by swinging the cover 46 into open position and the fastening member here shown as a cross head 23 is secured to the pulling vehicle.

As soon as the coupling is effected between the head 23 and the tractor or truck, the latter is backed up until the conical surface 33 of the pull bar head engages the recesses of the arms 34, 35 and forces the arms apart, thus allowing the head 25 to move to the position shown in Fig. 2, whereupon the springs 38 pull the arms 34 and 35 into locking position.

When it is again desired to release the bar 19 the portion 48 of the closure is grasped and raised thus causing the arms 34 and 35 to be separated and allowing movement of the head 25.

If desired a collar 50 may be placed between the end of the coupling member 21 and the adjacent portion of the end member 12 as shown in Fig. 2. The various parts of our telescoping drawbar may be made of steel, bronze, etc., as best meets the requirements.

From the foregoing description it will be apparent that we have invented a novel telescoping drawbar which can be economically manufactured and which is highly efficient in use.

We claim:

1. In a telescoping drawbar, a support, a pull bar slidably mounted in said support, said pull bar having a head thereon, said support including a housing, a closure movable on the housing, shiftable locking means in the housing engaging the pull bar to limit its movement, and means operated by movement of said closure for shifting said locking means.

2. In a telescoping drawbar, a pair of end members each having a portion adapted to be connected to a vehicle, each of said end members having an aperture therethrough, a tube connecting said end members, one of said end members having a chamber, a pull bar mounted in said tube, said pull bar including one end passing through the aperture in one of said end members, said pull bar having a diameter less than the internal diameter of the tube, said pull bar having a head thereon, said head including a cylindrical portion slidable in said tube, said head also including a frusto-conical portion, said frusto-conical portion having a cylindrical pilot thereon, said chamber having a bore therein receiving said pilot, a pair of clamping arms pivotally mounted in said chamber, each of said arms including a semi-cylindrical shoulder adapted to engage one face of said head, a plurality of cam members engaging said arms, a lever connected to each of said cam members, and spring means normally urging said clamping arms to a position to engage said head.

3. In a telescoping drawbar, a pair of end members each having a portion adapted to be connected to a vehicle, each of said end members having an aperture therethrough and having a threaded recess, an elongated tube threaded in said recesses and connecting said end members, one of said end members having a chamber, a pull bar disposed in said tube, said pull bar including one end passing through the aperture in one of said end members, a cross bar threadedly engaging said one end of the pull bar and disposed to engage said vehicle, said pull bar having a diameter less than the internal diameter of the tube, said bar having a head thereon, said head including a portion slidable in said tube, said head also including a frusto-conical portion, said frusto-conical portion having a cylindrical pilot thereon, said pilot passing through said chamber, the outer end wall of said chamber having a bore therein for receiving said pilot, a pair of clamping arms pivotally mounted in said chamber, each of said arms including a shoulder adapted to engage one face of said head, and means to shift said arms.

4. In a telescoping drawbar, a pair of end members each having a portion adapted to be secured to a vehicle, each of said end members having an aperture therethrough and having a threaded recess, an elongated tube threaded in said recesses and connecting said end members, one of said end members having a chamber, a pull bar disposed in said tube, said pull bar including one end passing through the aperture in one of said end members, a cross bar threadedly engaging said one end of the pull bar and disposed for vehicle coupling, said pull bar having a diameter less than the internal diameter of the tube, said bar having a head thereon, said head including a portion slidable in said tube, said head also including a frusto-conical portion, a pair of clamping arms pivotally mounted in said chamber, each of said arms including a shoulder adapted to engage one face of said head, a plurality of cam members engaging said arms, a lever connected to each of said cam members, said chamber having a pivoted closure thereon, a link connecting said lever and said closure, and spring means normally urging said clamping arms to a position to engage said head.

5. In a telescoping drawbar, a pair of end members each having a portion adapted to be connected to a vehicle, each of said end members having an aperture therethrough and having a threaded recess, an elongated tube threaded in said recesses and connecting said end members, one of said end members having a chamber, a pull bar disposed in said tube, said pull bar including one end passing through the aperture in one of said end members, a collar slidable on the pull bar, a cross bar threadedly engaging said one end of the pull bar and disposed to engage said collar, said pull bar having a diameter less than the internal diameter of the tube, said bar having a head thereon, said head including a cylindrical portion slidable in said tube, said head also including a frusto-conical portion, said frusto-conical portion having a cylindrical pilot thereon, said pilot passing through said chamber, said other end member having a bore therein receiving said pilot, a pair of clamping arms pivotally mounted in said chamber, each of said arms including a semi-cylindrical shoulder adapted to engage one face of said head, a plurality of cam members engaging said arms, a lever connected to each of said cam members, said chamber having a pivoted closure thereon, a link connecting said lever and said closure, and spring means normally urging said clamping arms to a position to engage said head.

DELMAR R. CONRAD.
FRANK M. REYNOLDS.

REFERENCES CITED

The following references are of record in the file of this patent:

UNITED STATES PATENTS

| Number | Name | Date |
| --- | --- | --- |
| 597,792 | Strahle | Jan. 25, 1898 |
| 599,883 | Turk et al. | Mar. 1, 1898 |
| 1,333,384 | Buller | Mar. 9, 1920 |
| 1,610,902 | Tomlinson | Dec. 14, 1926 |
| 1,699,397 | Klein | Jan. 15, 1929 |